United States Patent
Bai et al.

(10) Patent No.: US 11,390,282 B2
(45) Date of Patent: Jul. 19, 2022

(54) SYSTEM AND METHOD FOR INTERSECTION COMMUNICATION

(71) Applicant: Honda Motor Co., Ltd., Tokyo (JP)

(72) Inventors: Xue Bai, Novi, MI (US); Samer Rajab, Novi, MI (US); Danyang Tian, Ann Arbor, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 149 days.

(21) Appl. No.: 16/784,644

(22) Filed: Feb. 7, 2020

(65) Prior Publication Data

US 2021/0245755 A1 Aug. 12, 2021

(51) Int. Cl.
| | |
|---|---|
| *B60W 30/18* | (2012.01) |
| *G05D 1/00* | (2006.01) |
| *G05D 1/02* | (2020.01) |
| *G08G 1/01* | (2006.01) |
| *H04L 67/12* | (2022.01) |
| *H04L 47/726* | (2022.01) |
| *G08G 1/00* | (2006.01) |

(52) U.S. Cl.
CPC ..... *B60W 30/18036* (2013.01); *G05D 1/0088* (2013.01); *G05D 1/021* (2013.01); *G08G 1/0125* (2013.01); *G08G 1/22* (2013.01); *H04L 47/728* (2013.01); *H04L 67/12* (2013.01); *B60W 2554/4041* (2020.02); *B60W 2555/60* (2020.02)

(58) Field of Classification Search
CPC ....... B60W 30/18036; B60W 2555/60; B60W 2554/4041; G05D 1/0088; G05D 1/021; G08G 1/0125; G08G 1/0137; G08G 1/0145; G08G 1/0112; G08G 1/22; H04L 67/12; H04L 47/728

USPC .............. 701/23, 26, 114; 340/929
See application file for complete search history.

(56) References Cited

U.S. PATENT DOCUMENTS

| | | | |
|---|---|---|---|
| 6,307,484 B1 | 10/2001 | Sasaki et al. | |
| 7,498,954 B2 * | 3/2009 | Boss ................. | B62D 15/0285 |
| | | | 340/932.2 |
| 7,797,108 B2 | 9/2010 | Grimm | |
| 8,552,848 B2 | 10/2013 | Rao et al. | |
| 9,773,411 B2 | 9/2017 | Popple | |
| 9,802,609 B2 | 10/2017 | Wolf | |
| 10,140,859 B1 * | 11/2018 | Greenberger ......... | G08G 1/096 |
| 10,304,333 B2 | 5/2019 | Engel et al. | |

(Continued)

FOREIGN PATENT DOCUMENTS

| | | |
|---|---|---|
| CN | 107274699 | 10/2017 |
| KR | 101344320 | 4/2014 |
| WO | 2018110178 | 6/2018 |

*Primary Examiner* — Elaine Gort
*Assistant Examiner* — Ellis B. Ramirez
(74) *Attorney, Agent, or Firm* — Rankin, Hill & Clark LLP

(57) ABSTRACT

A computer-implemented method for intersection communication includes detecting a first vehicle behind a host vehicle and in a same lane as the host vehicle and determining a rear distance between a rear end of the host vehicle and a front end of the first vehicle. The method also includes transmitting a backup request to the first vehicle based on the rear distance and a wait time period between the stop state and a go state controlled by a traffic signal device. Further, the method includes controlling the host vehicle to perform a backup maneuver with respect to an intersection based on the rear distance and the wait time period.

20 Claims, 5 Drawing Sheets

(56) References Cited

U.S. PATENT DOCUMENTS

| | | | |
|---|---|---|---|
| 10,424,196 B1* | 9/2019 | McEnroe | H04L 67/22 |
| 2018/0001819 A1 | 1/2018 | Imbe | |
| 2018/0334163 A1* | 11/2018 | Beauvais | B62D 15/0285 |
| 2019/0206236 A1* | 7/2019 | Tao | G05D 1/0088 |
| 2019/0236948 A1* | 8/2019 | Wang | G05D 1/0276 |
| 2020/0074061 A1* | 3/2020 | Kim | B60R 25/24 |
| 2021/0005082 A1* | 1/2021 | Tsfasman | G08G 1/0112 |
| 2021/0056852 A1* | 2/2021 | Lund | G08G 1/0112 |

\* cited by examiner

SYSTEM AND METHOD FOR INTERSECTION COMMUNICATION

BACKGROUND

Traffic signal timing, traffic signal visibility, and driving behaviors related to traffic signaling can cause a vehicle to unsuccessfully stop before entering an intersection. Despite measures to prevent late stops and red-light running, in some cases, a vehicle stops within the intersection during a red light traffic signal. Unintentional or intentional blocking of an intersection can create traffic congestion, cause significant delays, and compromise road safety. Vehicle communication with other vehicles and infrastructures can assist resolution of intersection blocking.

BRIEF DESCRIPTION

According to one aspect, a computer-implemented method for communication at an intersection having a traffic device, includes detecting a host vehicle stopped in the intersection during a stop state controlled by the traffic signal device. The method includes detecting a first vehicle behind the host vehicle and in the same lane as the host vehicle and determining a rear distance between a rear end of the host vehicle and a front end of the first vehicle. The method also includes transmitting a backup request to the first vehicle based on the rear distance and a wait time period between the stop state and a go state controlled by the traffic signal device. Further, the method includes controlling the host vehicle to perform a backup maneuver with respect to the intersection based on the rear distance and the wait time period.

According to another aspect, a system for intersection communication, includes a traffic signal device for controlling traffic at an intersection, and a processor operatively connected for computer communication using a communication network to the traffic signal device. The processor detects a host vehicle stopped in the intersection during a stop state controlled by the traffic signal device and detects a first vehicle behind the host vehicle and in the same lane as the host vehicle. The processor determines a rear distance between a rear end of the host vehicle and a front end of the first vehicle and transmits a backup request using the communication network to the first vehicle based on the rear distance and a wait time period between the stop state and a go state controlled by the traffic signal device. The processor controls the host vehicle to perform a backup maneuver with respect to the intersection based on the rear distance and the wait time period.

According to a further aspect, a non-transitory computer-readable storage medium including instructions that when executed by a processor, causes the processor to detect a host vehicle stopped in an intersection controlled by a traffic signal device. The host vehicle is stopped during a stop state controlled by the traffic signal device. The processor detects a first vehicle behind the host vehicle and in the same lane as the host vehicle, and determines a rear distance between a rear end of the host vehicle and a front end of the first vehicle. The processor transmits a backup request to the first vehicle based on the rear distance and a wait time period between the stop state and a go state controlled by the traffic signal device. Further, the processor controls the control the host vehicle to perform a backup maneuver with respect to the intersection based on the rear distance and the wait time period.

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1A:
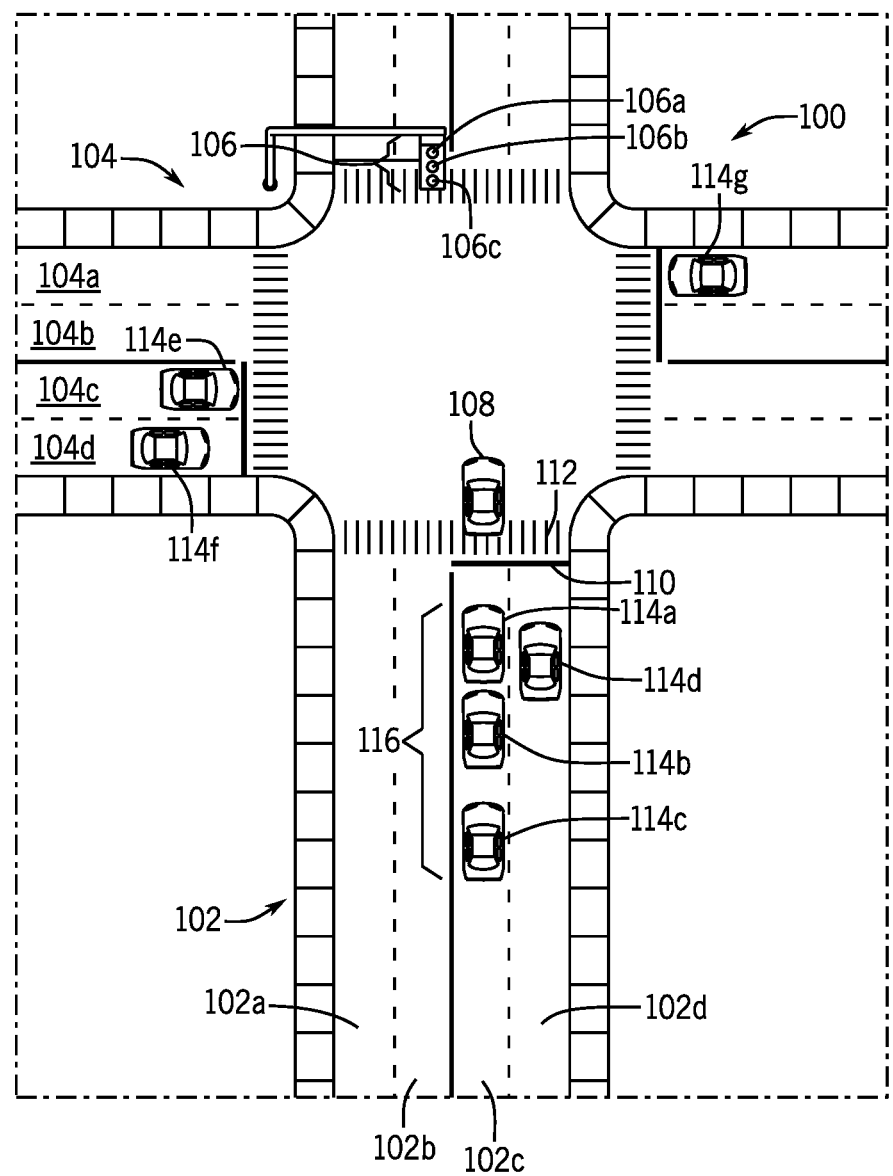
FIG. 1A is a schematic diagram of an intersection according to an exemplary embodiment.

The following includes definitions of selected terms employed herein. The definitions include various examples and/or forms of components that fall within the scope of a term and that may be used for implementation. The examples are not intended to be limiting. Further, the components discussed herein, may be combined, omitted or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Processor Area network (MAY), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more computing devices (e.g., computer, personal digital assistant, cellular telephone, network device, vehicle, vehicle computing device, infrastructure device, roadside device) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. A database may be stored, for example, at a disk and/or a memory.

"Disk," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Operable connection," or a connection by which entities are "operably connected," is one in which signals, physical communications, and/or logical communications may be sent and/or received. An operable connection may include a wireless interface, a physical interface, a data interface, and/or an electrical interface.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Portable device," as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more human occupants. Further, the term "vehicle" may include vehicles that are automated or non-automated with pre-determined paths or free-moving vehicles.

"Vehicle control system," and/or "vehicle system," as used herein may include, but is not limited to, any automatic or manual systems that may be used to enhance the vehicle, driving, and/or security. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

The systems and methods discussed herein facilitate control and communication between vehicles and infrastructures to resolve traffic situations. For example, allowing a host vehicle to communicate with other vehicles (e.g., trailing vehicles) in order to reverse when the host vehicle is stopped in an intersection and thus affecting traffic flow at the intersection. Referring now to the drawings, wherein the showings are for purposes of illustrating one or more exemplary embodiments and not for purposes of limiting same, FIG. 1A is an illustrative example of a traffic scenario, specifically, an intersection 100. The intersection 100 includes a first roadway 102 and a second roadway 104. The first roadway 102 is a four lane two-way street. Specifically, the first roadway 102 includes a lane 102a, a lane 102b, a lane 102c, and a lane 102d. Traffic flow in the lane 102a and the lane 102b runs in an opposite direction to traffic flow in the lane 102c and the lane 102d. The second roadway 104 is a four lane two-way street. Specifically, the second roadway 104 includes a lane 104a, a lane 104b, a lane 104c, and a lane 104d. Traffic flow in the lane 104a and the lane 104b runs in an opposite direction to traffic flow in the lane 104c and the lane 104d. The first roadway 102 and the second roadway 104 meet together to form the intersection 100. Thus, the intersection 100 in FIG. 1A is a four-legged intersection. It is understood that any number of roads, lanes, and intersections other than that shown in FIG. 1A can be implemented with the methods and system discussed herein.

In FIG. 1A, the intersection 100 is a controlled intersection regulated by a traffic signal device 106. A controlled intersection, as used herein, is an intersection in which an entrance into the intersection from any of the approaches (e.g., roads, lanes) is controlled by a regulatory sign or traffic signal (e.g., traffic light, yield sign, stop sign, smart sign, or other traffic indicators). Thus, in FIG. 1A, the traffic signal device 106 is used to implement traffic rules and control traffic at the intersection 100. The traffic signal device 106 includes a red light 106a, a yellow light 106b, and a green light 106c, which are projected to vehicles in the vicinity of the intersection 100 to instruct the vehicles to "stop", "yield", or "go", respectively. However, it is understood that the systems and methods discussed herein can be implemented with any type of regulatory sign or traffic signal. For example, the traffic signal device 106 can be a smart regulatory sign (e.g., a regulatory sign with computer communication functionality) that does not include the red light 106a, the yellow light 106b, and/or the green light 106c.

In FIG. 1A, when the red light 106a is activated (i.e., ON), vehicles travelling in the lane 102c and the lane 102d are instructed to stop movement through the intersection 100. When the yellow light 106b is activated (i.e., ON), vehicles travelling in the lane 102c and the lane 102d are instructed to slow (e.g., yield) movement through the intersection 100. When the green light 106c is activated (i.e., ON), vehicles travelling in the lane 102c and the lane 102d are instructed to move through the intersection 100. Each of the lights are controlled by the traffic signal device 106 to periodically alternate in a cycle. Thus, each light is activated for a particular duration of time. The components of the traffic signal device 106 will be discussed in more detail with FIG. 2.

Referring again to FIG. 1A, a host vehicle 108 is shown traversing a stop line 110 and a crosswalk line 112 thereby blocking a portion of the intersection 100. For example, in this scenario, a driver (not shown) of the host vehicle 108 or a control system of the host vehicle 108 (e.g., autonomous and/or automatically controlled vehicles) may have misjudged the timing of the traffic signal device 106 from the yellow light 106b to the red light 106a, or misjudged a distance to the stop line 110 with respect to vehicle speed. Accordingly, the host vehicle 108 makes a "late stop" within the intersection 100 and beyond a period of time allowing vehicles to pass through the intersection 100 controlled by the traffic signal device 106. This behavior can create traffic congestion at the intersection 100 by blocking the flow of traffic regulated by the traffic signal device 106 at the intersection 100.

As shown in FIG. 1A, there are several remote vehicles 114 in the vicinity of the intersection 100 that can be affected by the host vehicle 108 blocking the intersection 100. Specifically, a remote vehicle 114a, a remote vehicle 114b, and a remote vehicle 114c are travelling behind, in the same direction, and in the same lane (i.e., the lane 102c) as the host vehicle 108. A remote vehicle 114d is travelling behind, in the same direction, and in an adjacent lane (i.e., the lane 102d) as the host vehicle 108. A remote vehicle 114e and a remote vehicle 114f are travelling along the second roadway 104 and are stopped at the intersection 100. Additionally, a remote vehicle 114g is travelling along the second roadway 104, in a direction opposite of the remote vehicle 114e and the remote vehicle 114f, and is stopped at the opposite side of the intersection 100. In this scenario, because the host vehicle 108 made a "late stop" within the intersection 100, the host vehicle 108 can create a traffic flow block by preventing the remote vehicle 114e and the remote vehicle 114f from traversing the intersection 100.

As will be discussed herein, one or more of the host vehicle 108 and the vehicles 114 can be configured for computer communication with one another, the traffic signal device 106, and other infrastructures and/or systems. Intersection communication can facilitate movement of the host vehicle 108 so that the host vehicle 108 is not impeding traffic flow at the intersection 100. In some embodiments, one or more of the host vehicle 108 and/or the remote vehicles 114 can be identified as a platoon 116 that are controlled in concert with one another to resolve the traffic scenario at the intersection 100. In the examples discussed herein, a platoon 116 includes the remote vehicle 114a, the remote vehicle 114b, and the remote vehicle 114c, which are travelling in the same lane (i.e., the lane 102c) as the host vehicle 108. However, it is understood that the platoon 116 can include any number and any one of the vehicles in the vicinity of the intersection 100

Figure 1B:
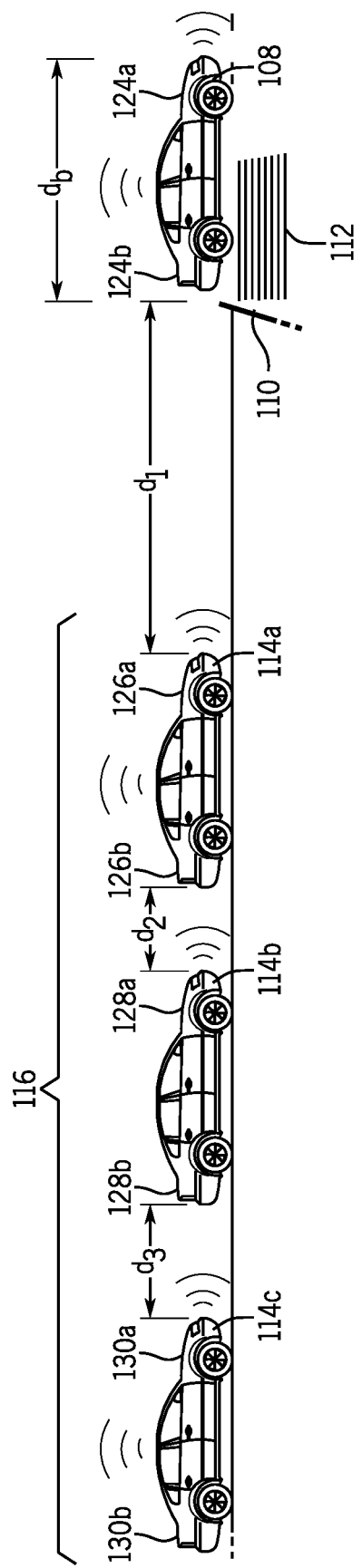
FIG. 1B is a schematic diagram of the host vehicle 108 and the platoon 116 of FIG. 1A according to an exemplary embodiment.

FIG. 1B is a schematic view of the host vehicle 108, the remote vehicle 114a, the remote vehicle 114b, and the remote vehicle 114c travelling in the lane 102c of FIG. 1A. In some embodiments, the remote vehicle 114a, the remote vehicle 114b, and the remote vehicle 114c can be referred to as trailing vehicles. In FIG. 1B, distance $d_b$ is the distance required for the host vehicle 108 to move in a rearward direction so that the intersection 100 is no longer blocked by the host vehicle 108 and/or the host vehicle 108 is no longer located in the intersection 100. Said differently, distance $d_b$ can be a distance from the stop line 110 and/or the crosswalk line 112 to a front end 124a of the host vehicle 108. In some embodiments discussed herein, the distance $d_b$ is referred to as a backup distance. In other embodiments, the distance required for the host vehicle 108 to move in a rearward direction so that the intersection 100 is no longer blocked by the host vehicle 108 and/or the host vehicle 108 is no longer located in the intersection 100, is equal to a length of the host vehicle 108, a half of the length of the host vehicle 108, a length of an average vehicle, or a half of the length of an average vehicle.

In FIG. 1B, the distance $d_1$ is a rearward distance between a rear end 124b of the host vehicle 108 and a front end 126a of the remote vehicle 114a. The distance $d_2$ is a rearward distance between a rear end 126b of the remote vehicle 114a and a front end 128a of the remote vehicle 114b. Further, the distance $d_3$ is a rearward distance between a rear end 128b of the remote vehicle 114b and the front end 130a of the remote vehicle 114c. In some embodiments, the distance $d_1$, the distance $d_2$, and/or the distance $d_3$ can be referred to as a rear distance. As will be discussed in detail herein, for the host vehicle 108 to perform a backup maneuver (i.e., move in a rearward direction) according to the distance $d_b$, sufficient space (e.g., of at least a distance equal to or greater than the distance $d_b$) behind the host vehicle 108 must be available.

As mentioned above, in some embodiments, the remote vehicle 114a, the remote vehicle 114b, and the remote vehicle 114c can be considered a platoon 116. In some embodiments, the platoon 116 can also include the host vehicle 108. One or more of the vehicles in the platoon 116 can work together to resolve the blocked intersection 100 created by the host vehicle 108. In the configuration shown in FIG. 1B, the remote vehicle 114a can also be referred to as a first vehicle or a leader vehicle of the platoon 116. The leader vehicle of the platoon 116 is the vehicle positioned at the front of the platoon 116 and/or closest to the rear end 124b of the host vehicle 108. The remote vehicle 114b can be referred to as the second vehicle of the platoon 116. Additionally, the remote vehicle 114c can be referred to as the third vehicle or the tail vehicle of the platoon 116. The tail vehicle of the platoon 116 is the vehicle positioned at the end of the platoon 116 and/or furthest from the rear end 124b of the host vehicle 108. It is understood that the host vehicle 108 and the remote vehicles 114 can be in different configurations and positions other than those shown in FIGS. 1A and 1B. In one embodiment discussed herein, the host vehicle 108 communicates with one or more vehicles in the platoon 116 to allow the host vehicle 108 to perform a reverse maneuver and thereby resolve the blocking scenario at the intersection 100.

Figure 2:
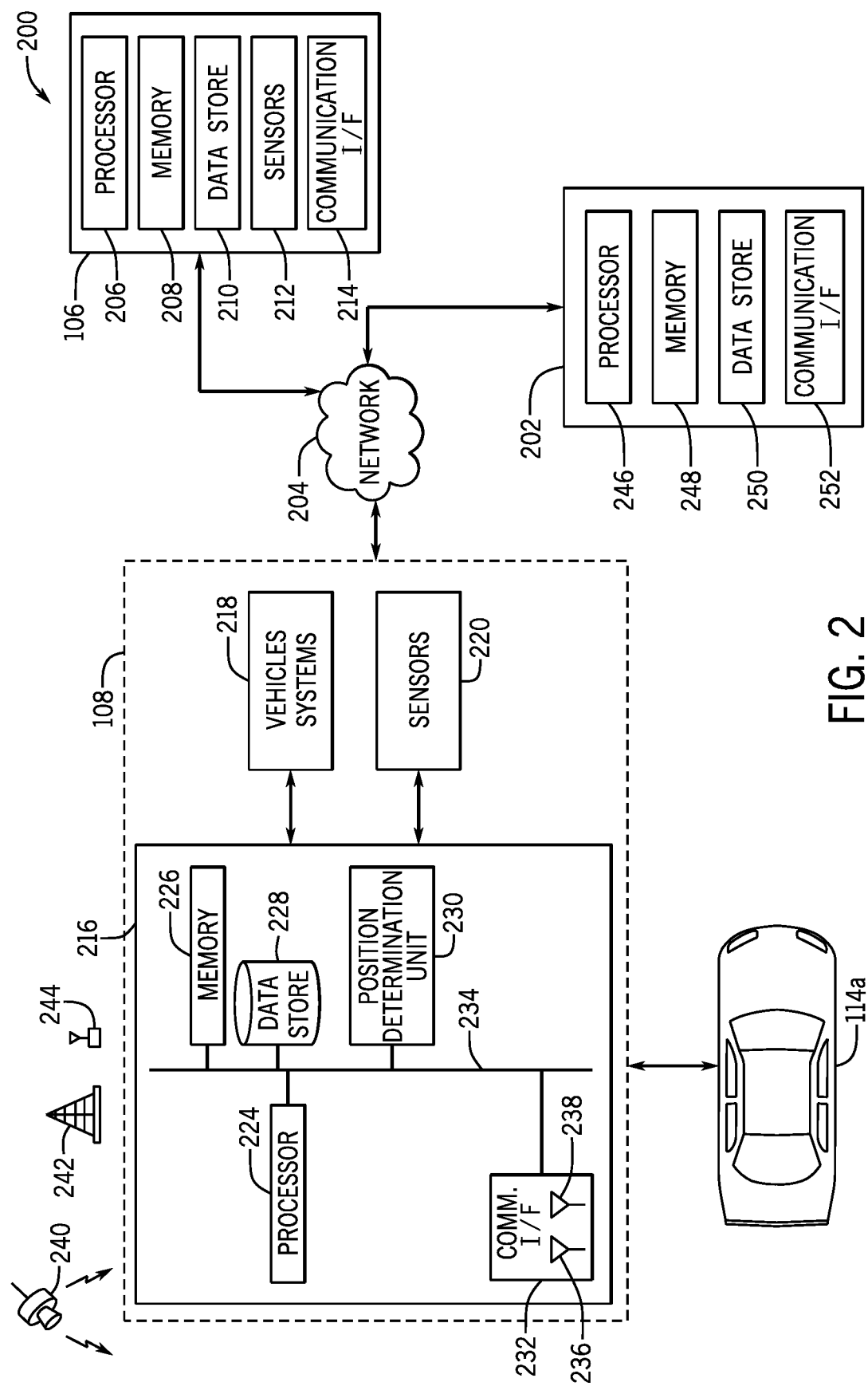
FIG. 2 is a block diagram of a network for intersection communication according to an exemplary embodiment.

Referring now to FIG. 2, a block diagram of a system 200 for intersection communication according to an exemplary embodiment is shown. The system 200 can be implemented with the components shown in FIGS. 1A and 1B. For convenience, like names and numerals represent like elements. In FIG. 2, the system 200 includes the traffic signal device 106, the host vehicle 108, remote vehicle 114a, and a remote server 202, each of which can be operatively connected for computer communication using, for example, a network 204. It is understood that the remote vehicle 114a, the remote vehicle 114b, the remote vehicle 114c, the remote vehicle 114d, the remote vehicle 114e, and the remote vehicle 114f, can include one or more of the components and/or functions discussed herein with respect to the host vehicle 108. Thus, it is understood that although not shown in FIG. 2, one or more of the components of the host vehicle 108, can also be implemented with and/or executed with the traffic signal device 106, the remote vehicle 114a, the remote vehicle 114b, the remote vehicle 114c, the remote vehicle 114d, the remote vehicle 114e, the remote vehicle 114f, the remote server 202, other entities, traffic indicators, and/or devices (e.g., V2I devices, V2X devices) operable for computer communication with the system 200 and/or the host vehicle 108. Further, it is understood that the components of the host vehicle 108 and the system 200, as well as the components of other systems, hardware architectures, and software architectures discussed herein, can be combined, omitted, or organized into different architectures for various embodiments.

In FIG. 2, the host vehicle 108 includes a vehicle computing device (VCD) 216, vehicle systems 218, and sensors 220. Generally, the VCD 216 includes a processor 224, a memory 226, a data store 228, a position determination unit 230, and a communication interface (I/F) 232, which are each operably connected for computer communication via a bus 234 and/or other wired and wireless technologies discussed herein. Referring again to the host vehicle 108, the VCD 216, can include provisions for processing, communicating and interacting with various components of the host vehicle 108 and other components of the system 200, including the traffic signal device 106, the remote vehicle 114a, and the remote server 202.

The processor 224 can include logic circuitry with hardware, firmware, and software architecture frameworks for facilitating control of the host vehicle 108 and facilitating intersection communication between the host vehicle 108, the traffic signal device 106, and/or the remote vehicle 114a. Thus, in some embodiments, the processor 224 can store application frameworks, kernels, libraries, drivers, application program interfaces, among others, to execute and control hardware and functions discussed herein. In some embodiments, the memory 226 and/or the data store (e.g., disk) 228 can store similar components as the processor 224 for execution by the processor 224.

The position determination unit 230 can include hardware (e.g., sensors) and software to determine and/or acquire position data about the host vehicle 108. For example, the position determination unit 230 can include a global positioning system (GPS) unit (not shown) and/or an inertial measurement unit (IMU) (not shown). Thus, the position determination unit 230 can provide a geoposition of the host vehicle 108 based on satellite data from, for example, a global position unit 240, or from any Global Navigational Satellite infrastructure (GNSS), including GPS, Glonass (Russian) and/or Galileo (European). Further, the position determination unit 230 can provide dead-reckoning data or motion data from, for example, a gyroscope, accelerometer, magnetometers, among other sensors (not shown). In some embodiments, the position determination unit 230 can be a navigation system that provides navigation maps, map data, and navigation information to the host vehicle 108.

The communication interface (I/F) 232 can include software and hardware to facilitate data input and output between the components of the VCD 216 and other components of the system 200. Specifically, the communication I/F 232 can include network interface controllers (not shown) and other hardware and software that manages and/or monitors connections and controls bi-directional data transfer between the communication I/F 232 and other components of the system 200 using, for example, the network 204. In particular, the communication I/F 232 can facilitate communication (e.g., exchange data and/or transmit messages) with other vehicles and/or devices, using any type of communication hardware and/or protocols discussed herein. For example, the computer communication can be implemented using a wireless network antenna 242 (e.g., cellular, mobile, satellite, or other wireless technologies) or road side equipment 244 (e.g., Dedicated Short Range Communications or other wireless technologies), and/or the network 204.

Referring again to the host vehicle 108, the vehicle systems 218 can include any type of vehicle control system and/or system described herein to enhance the host vehicle 108 and/or driving of the host vehicle 108. For example, the vehicle systems 218 can include autonomous driving systems, driver-assist systems, adaptive cruise control systems, lane departure warning systems, merge assist systems, freeway merging, exiting, and lane-change systems, collision warning systems, integrated vehicle-based safety systems, and automatic guided vehicle systems, or any other advanced driving assistance systems (ADAS).

The sensors 220, which can be implemented with the vehicle systems 218, can include various types of sensors for use with the host vehicle 108 and/or the vehicle systems 218 for detecting and/or sensing a parameter of the host vehicle 108, the vehicle systems 218, and/or the environment surrounding the host vehicle 108. For example, the sensors 220 can provide data about vehicles in proximity to the host vehicle 108, for example, the remote vehicles 114. The sensors 220 can also provide data about the intersection 100. For example, the sensors 220 can include visions sensors (e.g., imaging devices, cameras) and/or ranging sensors (e.g., RADAR, LIDAR).

It is understood that the sensors 220 can be disposed in one or more portions of the host vehicle 108. For example, although not shown in FIG. 2, the sensors 220 could be integrated into a dashboard, seat, seat belt, door, bumper, front, rear, corners, dashboard, steering wheel, center console, roof or any other portion of the host vehicle 108. In other cases, however, the sensors 220 could be portable sensors worn by a driver (not shown), integrated into a portable device (not shown), carried by the driver (not shown), integrated into an article of clothing (not shown) worn by the driver, or integrated into the body of the driver (e.g. an implant) (not shown).

As mentioned above, the sensors 220 can include ranging sensors. For example, a front long range RADAR and/or a front mid-range RADAR. The front long range RADAR can measure distance (e.g., lateral, longitudinal) and speed of objects surrounding the host vehicle 108. For example, the first long range RADAR can measure distance and speed of other vehicles (e.g., the remote vehicle 114a, the remote vehicle 114b, the remote vehicle 114c, the remote vehicle 114d, the remote vehicle 114e, and the remote vehicle 114f) and/or other objects (e.g., the intersection 100, the stop line 110, the crosswalk line 112) and other entities surrounding the host vehicle 108.

As mentioned above, in some embodiments, data transmission can be executed at and/or with other infrastructures and servers. For example, in FIG. 2, the VCD 216 can transmit and receive information directly or indirectly to and from the traffic signal device 106 and/or the remote server 202 over the network 204. The traffic signal device 106 includes a processor 206, a memory 208, data store 210, sensors 212, and a communication interface (I/F) 214. The processor 206 can include logic circuitry with hardware, firmware, and software architecture frameworks for facilitating operation and control of the traffic signal device 106. It is understood that the processor 206 can implement control in any mode, for example, in a fixed-time, actuated, and/or adaptive mode, The processor 206 can store application frameworks, kernels, libraries, drivers, application program interfaces, among others, to execute and control hardware and functions discussed herein. In some embodiments, the memory 208 and/or the data store (e.g., disk) 210 can store similar components as the processor 206 for execution by the processor 206.

As discussed with FIG. 1A, the traffic signal device 106 includes lights (e.g., LEDs), namely, the red light 106a, the yellow light 106b, and the green light 106c, which are controlled by the processor 206 to provide traffic movement indications to road users (e.g., the host vehicle 108, the vehicles 114). In particular, the processor 206 can control traffic signal timing at the intersection 100 by changing one or more parameters of the traffic signal device 106. For example, one or more indications (e.g., lights) or parameters (e.g., color, pattern) of the indications can be changed to indicate different traffic movements. As an illustrative example with reference to the traffic signal device 106 of FIG. 1A, the processor 206 can control a state of the traffic signal device 106 by controlling the red light 106a, the yellow light 106b, and/or the green light 106c. Each state can be controlled for a duration of time. In some embodiments, the duration of time of each state is predetermined or dynamically determined based on one or more factors, for example, traffic flow.

As used herein, when the traffic signal device 106 is in a stop state, the red light 106a is active (i.e., ON) and means road users must stop movement at the intersection 100. When the traffic signal device 106 is in a yield state, the yellow light 106b is active (i.e., ON) and means that the traffic signal device 106 is about to change to a stop state and therefore the road users must slow down and/or yield movement in preparation for the stop state at the intersection 100. When the traffic signal device 106 is in a go state, the green light 106c is active (i.e., ON) and means that road users have the right of way for movement through the intersection 100.

The sensors 212 can include various types of sensors for monitoring and/or controlling traffic flow. In particular, a timer (not shown) and/or a traffic detection sensor (not shown) can be used to control traffic flow (e.g., activate/deactivate the traffic signal device 106). For example, the sensors 212 can include visions sensors, (e.g., imaging devices, cameras) and/or ranging sensors (e.g., RADAR, LIDAR), for detecting vehicle movements and detecting vehicle data, for example, vehicle speed.

Referring again to the traffic signal device 106, the communication I/F 214 can include software and hardware to facilitate data input and output between the components of the traffic signal device 106 and other components of the system 200. Specifically, the communication I/F 214 can include network interface controllers (not shown) and other hardware and software that manages and/or monitors connections and controls bi-directional data transfer between the communication I/F 214 and other components of the system 200 using, for example, the network 204. Thus, the traffic signal device 106 is able to communicate data acquired by the sensors 212 and data about the operation of the traffic signal device 106 (e.g., timing, cycles, light operation). In some embodiments, the traffic signal device 106 is part of a V2X or V2I network.

Referring again to the system 200 of FIG. 2, the remote server 202 includes a processor 246, a memory 248, a data store 250, and a communication interface (I/F) 252. The processor 246 can include logic circuitry with hardware, firmware, and software architecture frameworks for intersection communication as described herein. In some embodiments, the processor 246 can store application frameworks, kernels, libraries, drivers, application program interfaces, among others, to execute and control hardware and functions discussed herein. In some embodiments, the memory 248 and/or the data store (e.g., disk) 250 can store similar components as the processor 246 for execution by the processor 246.

Further, the communication I/F 252 can include software and hardware to facilitate data input and output between the components of the remote server 202 and other components of the system 200. Specifically, the communication I/F 252 can include network interface controllers (not shown) and other hardware and software that manages and/or monitors connections and controls bi-directional data transfer between the communication I/F 252 and other components of the system 200 using, for example, the network 204.

In some embodiments, the VCD 216 can receive and transmit information to and from the remote server 202 including, but not limited to, traffic data, road data, vehicle location and heading data, high-traffic event schedules, weather data, or other transport/intersection related data. In some embodiments, the remote server 202 can be linked to multiple vehicles (e.g., the vehicles 114), other entities, and traffic infrastructures. In further embodiments, the remote server 202 may manage the host vehicle 108 and/or the vehicles 114 for intersection communication and resolution of traffic scenarios.

Using the system and network configuration discussed above, traffic situations at the intersection 100 can be monitored and traffic flow impediments (e.g., blocking the intersection 100) can be resolved. In particular, one or more entities in the system 200 can communicate to control one or more of: the traffic signal device 106, the host vehicle 108, and/or the remote vehicles 114 thereby resolving traffic flow issues at the intersection 100. Detailed embodiments describing exemplary methods using the system and network configuration discussed above will now be discussed in detail.

II. Methods for Intersection Communication

Figure 3:
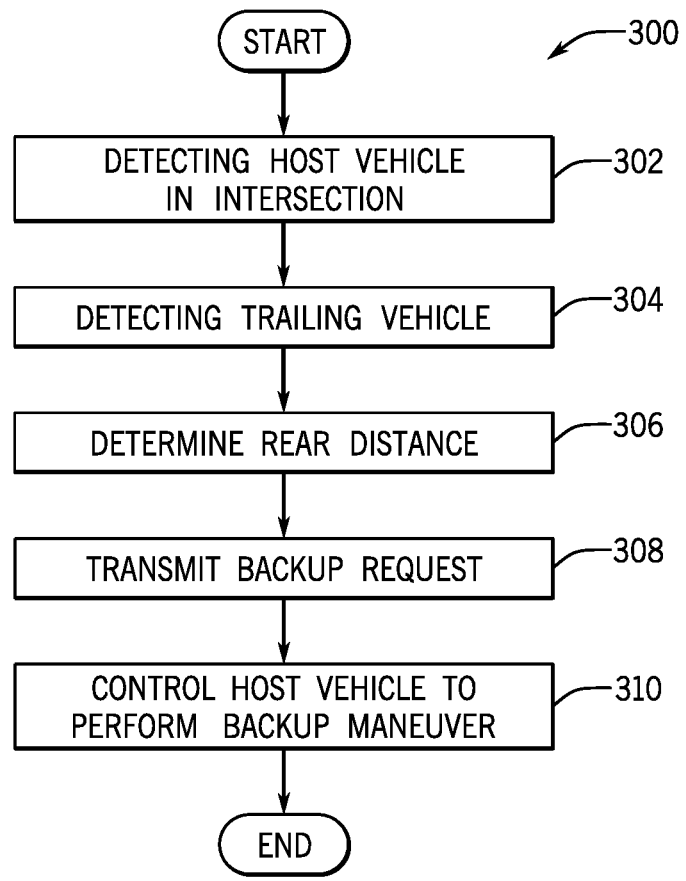
FIG. 3 is a process flow diagram of a method for intersection communication according to an exemplary embodiment.

With reference to FIG. 3, an exemplary method 300 describes operations of one or more components of FIGS. 1A, 1B, and 2 for intersection communication. At block 302, the method 300 includes detecting a vehicle in an intersection. For example, the host vehicle 108 (e.g., the processor 224) detects the traffic scenario illustrated at the intersection 100, namely, the presence of the host vehicle 108 stopped in the intersection 100 during a stop state controlled by the traffic signal device 106. More specifically, the processor 224 can determine that motion of the host vehicle 108 is stopped (i.e., no movement) based on data from the position determination unit 230 and/or the sensors 220. Furthermore, the processor 224 can determine whether the host vehicle 108 is within the intersection 100 using the position determination unit 230 and/or the sensors 220 to determine a position of the vehicle 108 with respect to the intersection 100, the stop line 110, and/or the crosswalk line 112. As discussed above, the stop state provides an indication to road users to stop movement. As an illustrative example with reference to FIG. 1A, when the traffic signal device 106 is in a stop state, the red light 106a is active (i.e., ON) meaning road users in the lane 102c must stop movement at the intersection 100. Accordingly, in some embodiments, the host vehicle 108 can also determine a state of the traffic signal device 106 using the sensors 220 by capturing image data about the traffic signal device 106. Object recognition techniques can be used to identify characteristics of the traffic signal device 106 (e.g., type of sign, color, lights) to determine a state of the traffic signal device 106.

In other embodiments, the host vehicle 108 can receive data about the intersection 100 and/or the host vehicle 108 from the traffic signal device 106, other vehicles 114, and/or the remote server 202. For example, the traffic signal device 106 can transmit data about the traffic signal device 106 (e.g., a state of the traffic signal device 106, cycles, timing, light activation) to the host vehicle 108. In other embodiments, the traffic signal device 106 can monitor the intersection 100 using the sensors 212 (e.g., RADAR) to detect the presence of the host vehicle 108 in the intersection 100 and transmit this data to the host vehicle 108.

In some embodiments, at block 302, the method 300 also includes determining a backup distance required for the host vehicle 108 to move in a rearward direction so that the intersection 100 is no longer blocked by the host vehicle 108 and/or the host vehicle 108 is no longer located in the intersection 100. For example, the backup distance in FIG. 1B is the distance $d_b$. Said differently, the backup distance $d_b$ can be a distance from the stop line 110 and/or the crosswalk line 112 to a front end 124a of the host vehicle 108. In other embodiments, the distance required for the host vehicle 108 to move in a rearward direction so that the intersection 100 is no longer blocked by the host vehicle 108 and/or the host vehicle 108 is no longer located in the intersection 100 is equal to a length of the host vehicle 108, a half of the length of the host vehicle 108, a length of an average vehicle, or a half of the length of an average vehicle.

Referring again to the method 300, at block 304, the method 300 includes detecting trailing vehicles, for example, detecting one or more vehicles directly behind the host vehicle 108. For example, detecting the first vehicle 114a behind the host vehicle 108 and in the same lane (i.e., the lane 102c) as the host vehicle 108. In some embodiments, the host vehicle 108 uses the sensors 220 for rearward detection of the first vehicle 114a.

At block 306, the method 300 includes determining a rear distance between the host vehicle 108 and the first vehicle 114a. More specifically, the host vehicle 108 uses the sensors 220 to determine the rear distance between a rear end 124b of the host vehicle 108 and a front end 126a of the first vehicle 114a. As shown in FIG. 1B, the rear distance between the host vehicle 108 and the first vehicle 114a is indicated by the distance $d_1$. By determining the rear distance $d_1$, the host vehicle 108 can determine whether the host vehicle 108 can execute a backup maneuver to move the host vehicle 108 in a reverse direction behind and/or at the stop line 110, thereby resolving the block at the intersection 100. Thus, in one embodiment, the host vehicle 108 can determine whether there is sufficient space behind the host vehicle 108 (e.g., between the host vehicle 108 and the first vehicle 114a) to allow the host vehicle 108 to execute a backup maneuver for the backup distance $d_b$. As will be discussed herein, the rear distance $d_1$ can be compared to the backup distance $d_b$ to determine whether the host vehicle 108 has sufficient space behind the host vehicle 108 to perform a backup maneuver for the backup distance $d_b$ and not collide with the first vehicle 114a. For example, in one embodiment, for the host vehicle 108 to perform a backup maneuver (i.e., move in a rearward direction) according to the distance $d_b$, sufficient space behind the host vehicle 108 must be available. In one embodiment, sufficient space is defined as a distance behind the host vehicle 108 equal to or greater than the backup distance $d_b$. In some embodiments, sufficient space also includes a predetermined buffer value, for example, the backup distance $d_b$ plus two (2) feet.

Referring again to FIG. 3, at block 308, the method 300 includes transmitting a backup request to the first vehicle 114a. For example, the backup request is transmitted from the host vehicle 108 to the first vehicle 114a based on the rear distance and a wait time period defined as a time period between the stop state and a go state, which is controlled by the traffic signal device 106. The processor 224 can calculate the wait time period as a duration of time remaining in the stop state of the traffic signal device 106. Thus, in one embodiment, the wait time period, is a duration of time until the traffic signal device 106 changes from the stop state to the go state (e.g., until the traffic signal device 106 activates the green light 106c). In some embodiments, the wait time period is based on a remaining duration of time of the stop state and a duration of time of a yield state.

For the host vehicle 108 to execute a backup maneuver for a backup distance $d_b$, there must be sufficient space behind the host vehicle 108 and sufficient time for the host vehicle 108 to execute the backup maneuver. In one embodiment, sufficient time is defined as a duration of time equal to or greater than a duration of time required for the host vehicle 108 to perform a backup maneuver for a backup distance $d_b$. The processor 224 can compare a duration of time required for the host vehicle 108 to perform a backup maneuver for a backup distance $d_b$ to the wait time period. If the duration of time required for the host vehicle 108 to perform a backup maneuver for a backup distance $d_b$ is less than or equal to the wait time period, the processor 224 can determine that there is sufficient time for the host vehicle 108 to perform a backup maneuver for a backup distance $d_b$. In other embodiments, for example, where more than one vehicle 114 is detected behind the host vehicle 108, sufficient time is defined as a duration of time equal to or greater than a duration of time required for the host vehicle 108 to perform a backup maneuver for a backup distance $d_b$, plus a duration of time required for each vehicle 114 detected behind the host vehicle 108 to perform a backup maneuver to allow the host vehicle 108 to perform a backup maneuver for the backup distance $d_b$.

Figure 4:
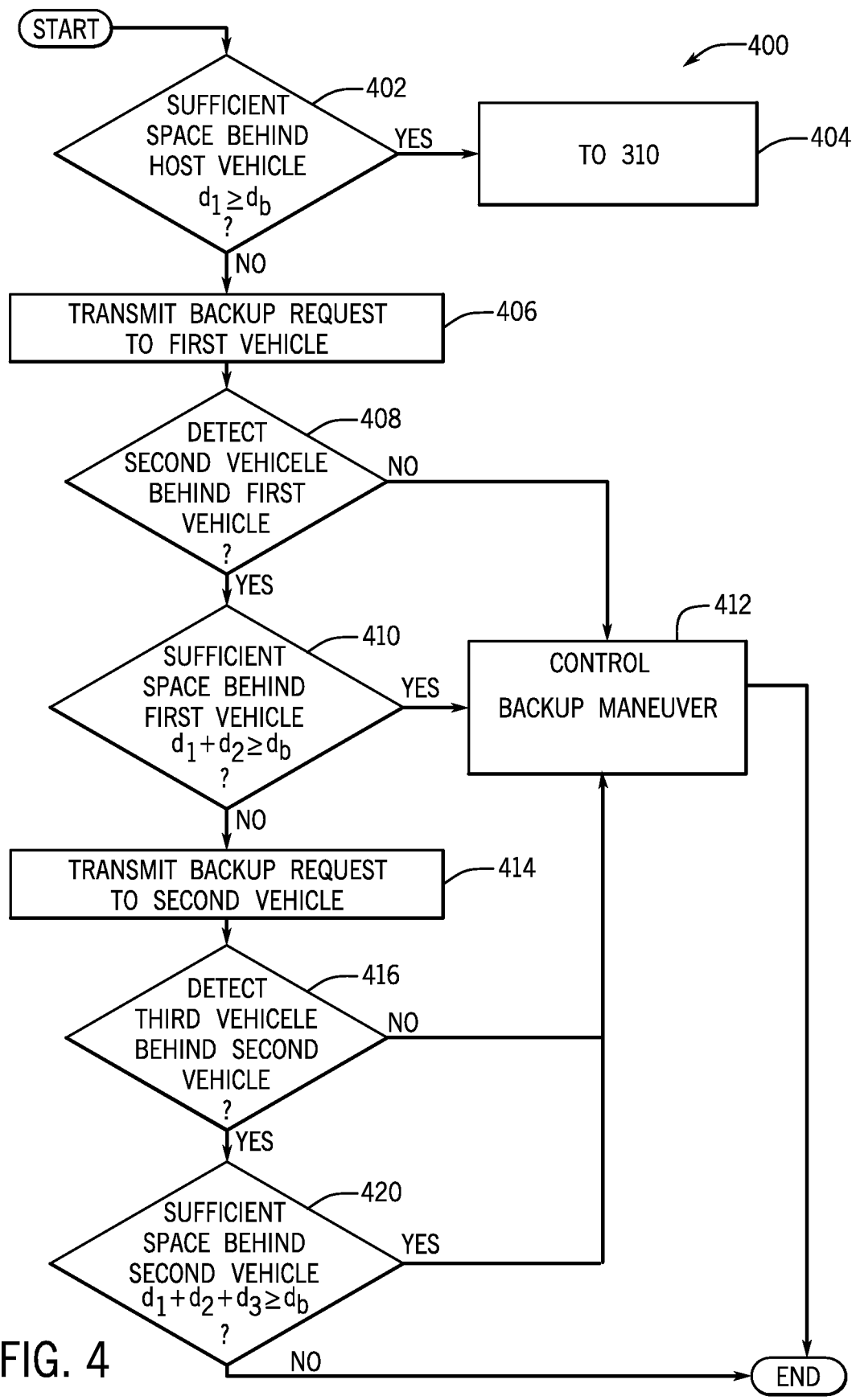
FIG. 4 is a process flow diagram of another method for intersection communication according an exemplary embodiment.

In some embodiments, the backup request transmitted from the host vehicle 108 to the first vehicle 114a includes a message asking the first vehicle 114a whether the host vehicle 108 may backup. As will be discussed with FIG. 4, in one embodiment, upon determining the host vehicle 108 does not have sufficient space to perform the backup maneuver, the backup request is transmitted to the first vehicle 114a and the first vehicle 114a transmits the backup request to one or more vehicles behind the host vehicle 108 and the first vehicle 114a, namely, the second vehicle 114b and/or the third vehicle 114c.

At block 310, the method 300 includes controlling the host vehicle 108 to perform a backup maneuver with respect to the intersection 100 based on the rear distance d and the wait time period. Controlling the host vehicle 108 to perform the backup maneuver causes the host vehicle 108 to move in a reverse direction with respect to the stop line 110. More specifically, the host vehicle 108 performs a backup maneuver in a rearward direction for the backup distance $d_b$. In another embodiment, the backup maneuver in the rearward direction can also include a turning angle. For example, the processor 224 (e.g., at block 302) can determine that the host vehicle 108 is stopped within the intersection 100 with a heading angle (i.e., turned to the left or right side). In this case, at block 310, the backup maneuver is performed by the host vehicle 108 based on the rear distance, the wait time period, and/or the heading angle. Accordingly, it is understood that the backup maneuver may not be a straight movement in a reverse direction, rather the backup maneuver can include a heading angle.

In another embodiment, block 310 can also include transmitting a notification to one or more remote vehicles 114 with information about the host vehicle 108 and the backup maneuver. For example, upon completing the backup maneuver, the processor 224 can transmit a notification to the remote vehicle 114e and the remote vehicle 114f indicating that the host vehicle 108 is no longer blocking the intersection 100. The processor 224 can also transmit a notification to the remote vehicle 114a, the remote vehicle 114b, and the remote vehicle 114c or any other vehicle in the vicinity of the host vehicle 108 and/or the intersection 100.

Although the method 300 of FIG. 3 describes control with respect to one vehicle behind the host vehicle 108, it is understood that more than one trailing vehicle may be positioned behind the host vehicle 108. For example, as shown in FIG. 1A and FIG. 1B, there may be more than one vehicle behind the host vehicle 108. Thus, the method 300 can also be applied to more than one vehicle. The method 300 will now be described in more detail with reference to FIG. 4 and a method 400 for intersection communication according to another embodiment. At block 402, the method 400 includes determining whether there is sufficient space behind the host vehicle 108 to perform a backup maneuver. As discussed above with block 308, in one embodiment, sufficient space is defined as a distance behind the host vehicle 108 equal to or greater than the backup distance $d_b$. Thus, the host vehicle 108 can compare a rear distance $d_1$ between the host vehicle 108 and the first vehicle 114a to the backup distance $d_b$. If the rear distance between the host vehicle 108 and the first vehicle 114a is equal to or greater than the backup distance $d_b$, the host vehicle 108 determines there is sufficient space behind the host vehicle 108 (i.e., YES at block 402). Otherwise, the host vehicle 108 determines there is not sufficient space behind the host vehicle 108 to complete the backup maneuver (i.e., NO at block 402). The determination at block 402 can be expressed mathematically as:

$$d_1 \geq d_b \tag{1}$$

In other embodiments, block 402 also includes determining whether there is sufficient space and sufficient time for the host vehicle 108 to execute a backup maneuver. For example, as discussed with block 308 of FIG. 3, for the host vehicle 108 to execute a backup maneuver for a backup distance $d_b$, there must be sufficient space behind the host vehicle 108 and sufficient time for the host vehicle 108 to execute the backup maneuver. In one embodiment, sufficient time is defined as a duration of time equal to or greater than a duration of time required for the host vehicle 108 to perform a backup maneuver for a backup distance $d_b$. In other embodiments, for example, where more than one vehicle 114 is detected behind the host vehicle 108, sufficient time is defined as a duration of time equal to or greater than a duration of time required for the host vehicle 108 to perform a backup maneuver for a backup distance $d_b$, plus a duration of time required for each vehicle 114 detected behind the host vehicle 108 to perform a backup maneuver to allow the host vehicle 108 to perform a backup maneuver for the backup distance $d_b$.

The processor 224 can compare a duration of time required for the host vehicle 108 to perform a backup maneuver for a backup distance $d_b$ to the wait time period.

If the duration of time required for the host vehicle to perform a backup maneuver for a backup distance $d_b$ is less than or equal to the wait time period, the processor 224 can determine that there is sufficient time for the host vehicle 108 to perform a backup maneuver for a backup distance $d_b$ (i.e., YES at block 402). Otherwise, the host vehicle 108 determines there is not sufficient time for the host vehicle 108 to complete the backup maneuver (i.e., NO at block 402).

If the determination at block 402 is YES, at block 404 the process proceeds to block 310 of FIG. 3 where the host vehicle 108 is controlled to perform a backup maneuver. If the determination at block 402 is NO, the method 400 proceeds to block 406. At block 406, the method 400 includes transmitting a backup request to the first vehicle 114*a*. The backup request provides an indication to the first vehicle 114*a* asking whether the host vehicle 108 may backup. For example, the backup request can be transmitted to the first vehicle 114*a* and displayed on an interface (not shown) in the first vehicle 114*a*. The backup request can include the rear distance $d_1$ between the host vehicle 108 and the first vehicle 114*a*, the wait time period and/or the backup distance $d_b$. At block 408, the method 400 includes detecting a second vehicle 114*b* behind the first vehicle 114*a*. Because the first vehicle 114*a* must perform a backup maneuver to allow the host vehicle 108 to perform the backup maneuver, the first vehicle 114*a* determines whether a vehicle is present behind the first vehicle 114*a*.

If the determination at block 408 is NO, the method 400 proceeds to block 412 where a backup maneuver is controlled. Specifically, the first vehicle 114*a* is controlled to perform a backup maneuver causing the first vehicle 114*a* to move in a rearward direction thereby increasing the rear distance $d_1$ to a distance sufficient for the host vehicle 108 to execute a backup maneuver. Said differently, in some embodiments, the first vehicle 114*a* moves in a rearward direction for a rearward travel distance, where the rearward travel distance is the distance required for the host vehicle 108 to move in a rearward direction so that the front end 124*a* of the host vehicle 108 is behind and/or at the stop line 110. The rearward travel distance may be the backup distance $d_b$. Further, upon completing a backup maneuver, the first vehicle 114*a* may send a response message to the host vehicle 108 indicating that the host vehicle 108 may proceed with the backup maneuver.

If it is determined that the second vehicle 114*b* is located behind the first vehicle 114*a* at block 408 (i.e., YES), at block 410, the method 400 includes determining if there is sufficient space behind the first vehicle 114*a*. More specifically, a rear distance is determined between a rear end 126*b* of the first vehicle 114*a* and a front end 128*a* of the second vehicle 114*b*. In FIG. 1B, the rear distance between the first vehicle 114*a* and the second vehicle 114*b* is shown as rear distance $d_2$.

Determining whether there is sufficient space is based on the rear distance $d_2$, the rear distance $d_1$, the backup distance $d_b$, and/or the wait time period. For example, as described above with blocks 308 and 402, sufficient space is defined as a distance behind the host vehicle 108 and a distance behind the first vehicle 114*a* equal to or greater than the backup distance $d_b$. Thus, on one embodiment, the host vehicle 108 can compare the sum of a rear distance $d_1$ between the host vehicle 108 and the first vehicle 114*a* and a rear distance $d_2$ between the first vehicle 114*a* and the second vehicle 114*b* to the backup distance $d_b$. This can be expressed mathematically as:

$$d_1 + d_2 \geq d_b \qquad (2)$$

If the determination at block 410 is YES, at block 412 the method 400 proceeds to block 412 where a backup maneuver is controlled. Specifically, the first vehicle 114*a* is controlled to perform a backup maneuver causing the first vehicle 114*a* to move in a rearward direction thereby increasing the rear distance $d_1$ to a distance sufficient for the host vehicle 108 to execute a backup maneuver (e.g., greater than or equal to the backup distance $d_b$).

If the determination at block 410 is NO, then at block 414, the method 400 includes transmitting a backup request to the second vehicle 114*b*. The backup request provides an indication to the second vehicle 114*b* asking whether the first vehicle 114*a* may backup. For example, the backup request can be transmitted to the second vehicle 114*b* and displayed on an interface (not shown) in the second vehicle 114*b*. The backup request can include the rear distance $d_1$ between the host vehicle 108 and the first vehicle 114*a*, the rear distance $d_2$ between the first vehicle 114*a* and the second vehicle 114*b*, the wait time period and/or the backup distance $d_b$.

At block 416, the method 400 includes determining if there is a third vehicle 114*c* behind the second vehicle 114*b*. If the determination at block 416 is NO, the method 400 proceeds to block 412 where a backup maneuver is controlled. More specifically, the host vehicle 108, the first vehicle 114*b* and/or the second vehicle 114*c* are controlled to cause the first vehicle 114*b* and/or the second vehicle 114*c* to each perform a backup maneuver thereby increasing the rear distance $d_1$ to a distance sufficient for the host vehicle 108 to execute a backup maneuver and increasing the rear distance $d_2$ to a distance sufficient for the first vehicle 114*a* to execute a backup maneuver. Accordingly, at block 416, the method 400 includes controlling the host vehicle 108 to perform a backup maneuver, the first vehicle 114*a* to perform a backup maneuver, and the second vehicle 114*b* to perform a backup maneuver. This causes the host vehicle 108, the first vehicle 114*a*, and the second vehicle 114*b* to move in a rearward direction in sync so that the that the intersection 100 is no longer blocked by the host vehicle 108 and/or the host vehicle 108 is no longer located in the intersection 100. Accordingly, the backup maneuver executed by the host vehicle 108, the backup maneuver executed by the first vehicle 114*a*, and the backup maneuver executed by the second vehicle 114*b* is based on the backup distance $d_b$, the rear distance $d_1$, and the second rear distance $d_2$.

If the determination at block 416 is YES, at block 420 the method 400 includes determining if there is sufficient space behind the second vehicle 114*b*. More specifically, a rear distance is determined between a rear end 128*b* of the second vehicle 114*b* and a front end 130*a* of the third vehicle 114*c*. In FIG. 1B, the rear distance between the second vehicle 114*b* and the third vehicle 114*c* is shown as rear distance $d_3$. As discussed above, determining whether there is sufficient space is based on the rear distance $d_1$, the rear distance $d_2$, the rear distance $d_3$, the backup distance $d_b$, and/or the wait time period. For example, as described above with blocks 308 and 402, sufficient space is defined as a distance behind the host vehicle 108, a distance behind the first vehicle 114*a*, and a distance behind the second vehicle 114*b* equal to or greater than the backup distance $d_b$. Thus, on one embodiment, the host vehicle 108 can compare the sum of a rear distance $d_1$ between the host vehicle 108 and the first vehicle 114*a*, and a rear distance $d_2$ between the first vehicle 114*a* and the second vehicle 114*b*, and a rear distance $d_3$ between the second vehicle 114b and the third vehicle 114c to the backup distance $d_b$. This can be expressed mathematically as:

$$d_1+d_2+d_3 \geq d_b \qquad (3)$$

If the determination at block 420 is YES, at block 412 the method 400 includes controlling a backup maneuver. More specifically, controlling the host vehicle 108, the first vehicle 114a, the second vehicle 114b, and the third vehicle 114c to each perform a backup maneuver as described above. If the determination at block 420 is NO, the method 400 ends. However, it is understood that the method 300 and the method 400 can continue for each vehicle behind the host vehicle 108 (e.g., a fourth vehicle, a fifth vehicle, and so on). Thus, it is understood that the steps shown in FIG. 4 can be implemented for each trailing vehicle behind the host vehicle 108, for example, the first vehicle 114a, the second vehicle 114b, and the third vehicle 114c. In some embodiments, if each trailing vehicle agrees to perform the backup maneuver, block 412 can also include forming a platoon 116 including the host vehicle 108, the first vehicle 114a, the second vehicle 114b, and the third vehicle 114c to perform the backup maneuver in sync. Thus, the platoon 116 is formed to perform the backup maneuver together in sync. In some embodiments, the platoon 116 is a temporary platoon that only exists until the backup maneuver is completed.

The embodiments discussed herein can also be described and implemented in the context of "computer-readable medium" or "computer storage medium." As used herein, "computer-readable medium" or "computer storage medium" refers to a non-transitory medium that stores instructions, algorithms, and/or data configured to perform one or more of the disclosed functions when executed. Computer-readable medium can be non-volatile, volatile, removable, and non-removable, media implemented in any method or technology for storage of information such as computer readable instructions, data structures, modules or other data. Computer-readable medium can include, but is not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can interface with. Computer-readable medium excludes non-transitory tangible media and propagated data signals.

It will be appreciated that various embodiments of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for communication at an intersection having a traffic signal device, comprising:
   detecting a host vehicle stopped in the intersection when the traffic signal device is in a stop state;
   detecting a first vehicle behind the host vehicle and in a same lane as the host vehicle;
   determining a rear distance between a rear end of the host vehicle and a front end of the first vehicle;
   determining a wait time period as a duration of time until the traffic signal device changes to a go state;
   transmitting a backup request to the first vehicle based on the rear distance and a wait time period; and
   controlling the host vehicle to perform a backup maneuver with respect to the intersection based on the rear distance and the wait time period.

2. The computer-implemented method of claim 1, wherein detecting the host vehicle stopped in the intersection includes determining a position of the host vehicle with respect to a stop line before the intersection.

3. The computer-implemented method of claim 2, wherein controlling the host vehicle to perform the backup maneuver causes the host vehicle to move in a reverse direction with respect to the stop line.

4. The computer-implemented method of claim 1, including upon determining the host vehicle does not have sufficient space to perform the backup maneuver, transmitting the backup request to the first vehicle.

5. The computer-implemented method of claim 4, including detecting a second vehicle behind the first vehicle and in the same lane as the first vehicle, and determining a second rear distance between a rear end of the first vehicle and a front end of the second vehicle.

6. The computer-implemented method of claim 5, including upon determining the first vehicle does not have sufficient space to perform a backup maneuver with respect to the host vehicle thereby allowing the host vehicle to perform the backup maneuver with respect to the intersection, transmitting a second backup request to the second vehicle.

7. The computer-implemented method of claim 6, including controlling the first vehicle and the second vehicle in sync to perform a backup maneuver with respect to the host vehicle based on the backup request and the second backup request.

8. The computer-implemented method of claim 1, including detecting a plurality of vehicles including the first vehicle behind the host vehicle and in the same lane as the host vehicle.

9. The computer-implemented method of claim 8, including upon determining the host vehicle does not have sufficient space to perform the backup maneuver, transmitting the backup request to the plurality of vehicles.

10. The computer-implemented method of claim 9, wherein the plurality of vehicles form a temporary platoon based on the backup request.

11. The computer-implemented method of claim 10, wherein the first vehicle being closest to the rear end of the host vehicle is a leader vehicle of the temporary platoon and a vehicle of the plurality of vehicles being the furthest from the rear end of the host vehicle is a tail vehicle of the temporary platoon.

12. The computer-implemented method of claim 10, wherein each vehicle in the temporary platoon moves in concert in a reverse direction based on the backup request.

13. A system for intersection communication, comprising:
   a traffic signal device for controlling traffic at an intersection according to at least a stop state and a go state; and
   a processor operatively connected for computer communication using a communication network to the traffic signal device, wherein the processor:
   detects a host vehicle stopped in the intersection when the traffic signal device is in the stop state controlled by the traffic signal device;
   detects a first vehicle behind the host vehicle and in a same lane as the host vehicle;
   determines a rear distance between a rear end of the host vehicle and a front end of the first vehicle;

transmits a backup request using the communication network to the first vehicle based on the rear distance and a wait time period, wherein the wait time period is a duration of time between the stop state and the go state controlled by the traffic signal device; and controls the host vehicle to perform a backup maneuver with respect to the intersection based on the rear distance and the wait time period.

14. The system of claim 13, wherein the processor detects a second vehicle behind the first vehicle and in the same lane as the first vehicle, and determines a second rear distance between a rear end of the first vehicle and a front end of the second vehicle.

15. The system of claim 14, wherein the processor determines the first vehicle does not have sufficient space to perform a backup maneuver with respect to the host vehicle thereby allowing the host vehicle to perform the backup maneuver with respect to the intersection, and the processor transmits a second backup request to the second vehicle.

16. The system of claim 15, wherein the processor controls the first vehicle and the second vehicle in sync to perform a backup maneuver with respect to the host vehicle based on the backup request and the second backup request.

17. A non-transitory computer-readable storage medium including instructions that when executed by a processor, causes the processor to:

detect a host vehicle stopped in an intersection controlled by a traffic signal device, wherein the host vehicle is stopped during a stop state controlled by the traffic signal device;

detect a first vehicle behind the host vehicle and in the same lane as the host vehicle;

determine a rear distance between a rear end of the host vehicle and a front end of the first vehicle;

transmit a backup request to the first vehicle based on the rear distance and a wait time period, wherein the wait time period is a duration of time between the stop state and a go state controlled by the traffic signal device; and control the host vehicle to perform a backup maneuver with respect to the intersection based on the rear distance and the wait time period.

18. The non-transitory computer-readable storage medium of claim 17, causing the processor to detect a second vehicle behind the first vehicle and in the same lane as the first vehicle, and determine a second rear distance between a rear end of the first vehicle and a front end of the second vehicle.

19. The non-transitory computer-readable storage medium of claim 18, causing the processor to determine the first vehicle does not have sufficient space to perform a backup maneuver with respect to the host vehicle thereby allowing the host vehicle to perform the backup maneuver with respect to the intersection, and transmit a second backup request to the second vehicle.

20. The non-transitory computer-readable storage medium of claim 19, causing the processor to control the first vehicle and the second vehicle in sync to perform a backup maneuver with respect to the host vehicle based on the backup request and the second backup request.

* * * * *